Feb. 28, 1928.
D. D. HEIMBURGER
NOZZLE
Filed April 11, 1927
1,660,557
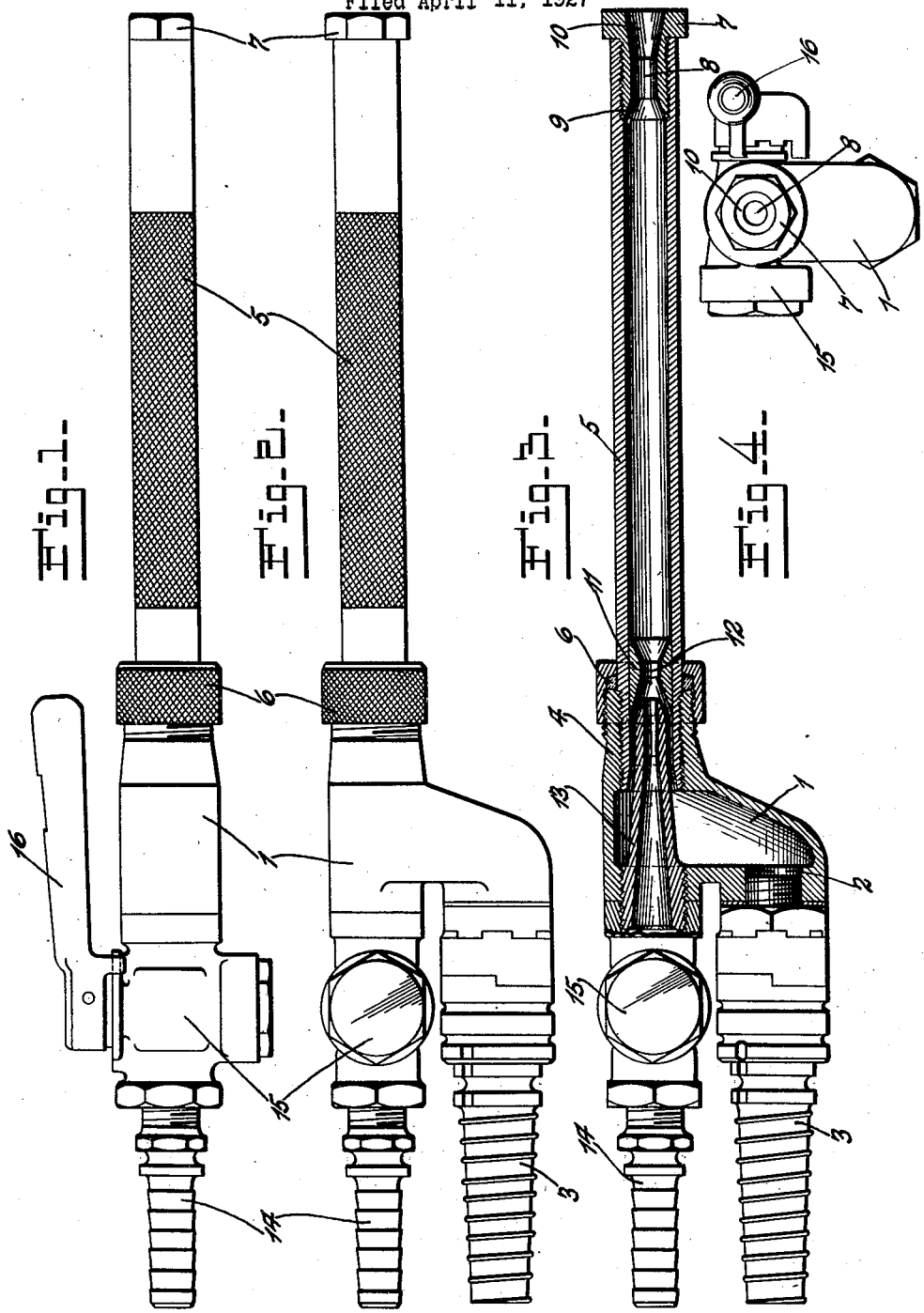
Inventor:
Douglas D. Heimburger,
by Rippey & Kingsland.
His Attorneys.

Patented Feb. 28, 1928.

1,660,557

UNITED STATES PATENT OFFICE.

DOUGLAS D. HEIMBURGER, OF ST. LOUIS, MISSOURI, ASSIGNOR TO MARQUETTE MANUFACTURING COMPANY.

NOZZLE.

Application filed April 11, 1927. Serial No. 182,599.

This invention relates to nozzles, and an object is to provide a nozzle for obtaining the mixture of air and water in desired proportions, and for ejecting the mixture.

Another object of the invention is to provide an improved device for mixing, and ejecting the mixture of, air and water comprising a nozzle constituting a mixing chamber, a chamber for receiving water from source of supply for admission into the mixing chamber, and an air inlet nozzle extending into one end of the mixing chamber element toward the reduced inlet through which the air and water pass to the mixing chamber, and means for adjusting the parts to obtain variation in the proportions of the air and water.

Other objects of the invention will appear from the following description, reference being made to the accompanying drawing in which Fig. 1 is a plan view of my improved nozzle.

Fig. 2 is a side elevation.

Fig. 3 is a longitudinal sectional view.

Fig. 4 is an outer end elevation of the nozzle.

The embodiment of the invention shown comprises a water receiving chamber 1 having an inlet opening 2 for attachment to one end of a hose connection 3, whereby water may be admitted into the chamber 1. The opening 2 is near one side of the chamber 1, and extending oppositely therefrom, near the opposite side of the chamber 1, is a tubular extension 4 threaded interiorly and exteriorly. A nozzle element 5 forming a mixing chamber for the air and water has one end screwed into the extension 4, the joint being rendered impervious by a sealing device 6 screwed onto the extension 4. The outer end of the nozzle mixing chamber element 5 has a nozzle tip 7 screwed into it and provided with a hole 8 of considerably less diameter than the internal diameter of the part 5, which hole 8 is flared at its inner end as indicated at 9 and at its outer end as indicated at 10. This tip constitutes a choke, so that the mixture of air and water discharged from the device will be sprayed.

Near the inner end of the mixing chamber 5 is a plug 11 having a hole 12 therethrough flaring at its ends, as clearly shown in Fig. 3. An air jet nozzle 13 is screwed into one wall of the water chamber 1 and extends entirely across said chamber and into the end of the nozzle mixing chamber element 5 and into the flared portion of the hole 12 through the plug 11. This nozzle 13 is spaced from the walls of the hole 12 and from the part 5, leaving a space entirely around the nozzle for the passage of air from the chamber 1 into the mixing chamber nozzle element 5 through the hole 12.

A hose connection 14 is attached to the nozzle 13 for the admission of air under compression or force. The passage through the nozzle 12 tapers from its outer end toward its inner end. The connection 14 is equipped with a valve 15 having a handle 16 whereby the valve may be opened or closed to any desired extent to vary the amount of air in proportion to the water admitted to the device.

This device is capable of application to various uses, and assuming that hot water be admitted into the chamber 1 it will surround and affect the temperature of the air admitted through the nozzle 13, while the air discharged through said nozzle 13 will tend to cool the water. The water passes from the chamber 1 around the nozzle 13 and is broken up by the air discharged from the end of the nozzle 13 as both the air and water pass through the restricted opening 12 to the mixing chamber element 5. In this way the thorough admixture of the water and air is obtained in the mixing chamber and, by the pressure of both, the mixture is ejected through the choke nozzle tip 7.

The sealing element 6 and the nozzle mixing chamber element 5 both are preferably spotted or knurled on their exteriors to afford proper grip for the hand for varying the adjustment of the parts.

In the use of this device the water entering the chamber 1 through the inlet 2 strikes the inclined wall of the chamber 1 opposite the inlet 2 and is thereby given a swirling movement. The water completely fills the chamber 1 and surrounds the nozzle 13. From the chamber 1 the water passes into the mixing chamber element 5 around the end of the nozzle 13 and passes beyond the end of said nozzle through the reduced passage 12 into the mixing chamber of the part 5 between the element 11 and the nozzle tip 7. The air discharged into the device from the nozzle 13 becomes mixed with the water passing through the reduced passage 12 and builds up pressure in the mixing chamber in the part 5 between the nozzle tip 7 and the part 11. The air and water are thoroughly mixed and discharged as a spray through the passage 12 with its flaring inner end 9 and flaring outer end 10.

The passageway through the element 11, as also that thru the nozzle tip 7, is Venturi-tube shaped. By Venturi-tube shape is denoted a passageway having a cylindrical portion of substantial axial length with flared walls connected to the cylindrical portion and leading therefrom in opposite directions.

The construction and arrangement of the parts may be varied within equivalent limits without departure from the nature and principle of the invention.

I do not restrict myself unessentially, but what I claim and desire to secure by Letters Patent is:—

1. A device of the character described comprising a water receiving chamber having an inlet thereto and an outlet therefrom, a discharge nozzle in connection with said outlet, means in said discharge nozzle forming a reduced tapered passage for admitting water to said nozzle from said chamber, an exteriorly tapered air nozzle extending into said reduced tapered passage, and a Venturi-tube shaped nozzle tip in connection with the outer end of said discharge nozzle and in alignment with said reduced tapered passage.

2. A device of the character described comprising a water chamber having an inlet passage near one side, a discharge nozzle in connection with said chamber out of line with said inlet, an air nozzle extending through said chamber into said discharge nozzle, an element in said discharge nozzle forming a reduced Venturi-tube shaped inlet passage thereto in line with and spaced from said air nozzle and a Venturi-tube shaped outlet from said discharge nozzle.

3. A device of the character described comprising a water chamber, means for admitting water into said chamber, an extension from said chamber, an air nozzle extending through said chamber into said extension, a tubular nozzle in said extension and having at its inlet end a Venturi-tube shaped opening receiving the end of said air nozzle and forming thereby an annular space around the end of said air nozzle and means for holding said tubular nozzle in different adjustments relative to said air nozzle whereby the size of said annular opening may be varied, and a second Venturi-tube shaped opening for the outlet end of said tubular nozzle.

4. A device of the character described comprising a water chamber having an inlet passage near one side, a discharge nozzle in connection with said chamber out of line with said inlet, an air nozzle extending through said chamber into said discharge nozzle, an element in said discharge nozzle forming a reduced tapered inlet passage thereto in line with said air nozzle, and a nozzle tip on the outer end of said discharge nozzle having flaring inner and outer ends connected by a reduced cylindrical passage of substantial axial length.

5. A device of the character described, comprising a water receiving chamber having an inlet thereto and an outlet therefrom, a discharge nozzle in connection with said outlet, an air nozzle extending into said discharge nozzle, said discharge nozzle having a Venturi-tube shaped inlet opening and a second Venturi-tube shaped opening for the outlet end of said discharge nozzle.

DOUGLAS D. HEIMBURGER.